(12) United States Patent
Dippon

(10) Patent No.: US 7,333,964 B2
(45) Date of Patent: Feb. 19, 2008

(54) TWO STEP DATA ANALYSIS

(75) Inventor: Thomas Dippon, Gaertringen (DE)

(73) Assignee: Agilent Technologies Inc., Santa Clara, CA (US)

( * ) Notice: Subject to any disclaimer, the term of this patent is extended or adjusted under 35 U.S.C. 154(b) by 261 days.

(21) Appl. No.: 11/268,103

(22) Filed: Nov. 7, 2005

(65) Prior Publication Data

US 2006/0179354 A1 Aug. 10, 2006

(30) Foreign Application Priority Data

Feb. 9, 2005 (EP) .................................. 05100915

(51) Int. Cl.
*G06N 5/00* (2006.01)

(52) U.S. Cl. .......................................... 706/20; 378/19

(58) Field of Classification Search .................. 706/20; 341/100; 375/371; 378/19, 62
See application file for complete search history.

(56) References Cited

U.S. PATENT DOCUMENTS

| | | | |
|---|---|---|---|
| 6,275,552 B1 | 8/2001 | Ando | ......................... 376/368 |
| 6,289,470 B1 | 9/2001 | Tanaka | ........................... 714/5 |
| 6,430,242 B1 * | 8/2002 | Buchanan et al. | ........... 375/371 |
| 6,470,071 B1 * | 10/2002 | Baertsch et al. | .............. 378/62 |
| 6,504,895 B1 * | 1/2003 | Dixon et al. | ................... 378/19 |
| 6,611,217 B2 * | 8/2003 | Buchanan et al. | ........... 341/100 |
| 6,671,828 B1 | 12/2003 | Tursich | ........................ 714/39 |

FOREIGN PATENT DOCUMENTS

EP 0997819 5/2000

* cited by examiner

*Primary Examiner*—Wilbert L Starks, Jr.

(57) ABSTRACT

A data analyzer for analyzing an incoming data stream, comprising a pattern matcher adapted for comparing in a first step the first data stream with a first data pattern and in a second step a second data stream with a second data pattern and for generating a match signal indicative of a match between the first data stream and the first data pattern or between the second data stream and the second data pattern, a trace memory adapted for storing a part of the first data stream dependent on the match signal of the first step, and for outputting stored data as second data stream in a second step and a data switch adapted for receiving the first data stream and the second data stream, and to be set in the first step to a first state for providing the pattern matcher with the first data stream and in the second step to a second state for providing the pattern matcher with the second data stream.

14 Claims, 3 Drawing Sheets

TWO STEP DATA ANALYSIS

BACKGROUND ART

1. Field of the Invention

The present invention relates to analyzing a data stream from a data source.

2. Discussion of the Background Art

Protocol analyzers record data traffic between two devices in real-time and visualize trace information at a defined level of the data protocol, e.g. on the packet level of a data packed oriented protocol. Therefore, protocol analyzers are equipped with corresponding protocol decoding capabilities.

Various data protocols are used to transfer data between communication devices. Exemplary standards for data protocols for a data exchange on chip level are PCI (Peripheral Component Interconnect) and PCI Express. These protocols allow reliable and fast interconnections of devices, e.g. between a CPU (Central Processing Unit) and its peripheral, within computers ranging from servers to workstations, Personal Computers, and mobile devices.

A protocol analyzer typically comprises a physical interface to the DUT (device under test), a pattern matcher for triggering on a particular sequence in a data stream and a trace memory that captures data in real-time. Analyzing of the captured data, e.g. searching or filtering is typically realized in a post process after data capturing.

An example for a protocol analyzer is the Agilent E2960A Protocol Analyzer of the applicant Agilent Technologies for analyzing PCI Express bus protocols in PCI Express based designs such as add-in cards, motherboards, chips and systems.

SUMMARY OF THE INVENTION

It is an object of the invention to provide improved analyzer. The object is solved by the independent claims. Preferred embodiments are shown by the dependent claims.

According to an embodiment of the present invention, an analyzer comprising a data switch, a pattern matcher, a trace memory and a control unit, is provided with an incoming data stream. In a first step, incoming data from a data source is acquired. Therefore, the data switch is controlled to provide the pattern matcher with the incoming data stream. The pattern matcher compares the incoming data stream with a first data pattern and generates a first match signal after a detection of a first match, i.e. if a data sequence within the incoming data stream equals at least partially to the first data pattern. On the base of at said match signal, the trace memory is controlled such that a specific part of the incoming data stream is kept stored. In a second step, after capturing the data in the trace memory, a search is performed in the acquired data. Therefore, the data switch is controlled to provide the pattern matcher with a second data stream generated by reading out the captured data from the trace memory. The pattern matcher compares the second data stream provided by the trace memory with a second data pattern and generates an indication, if a second match is detected.

The pattern matcher is thus used in both steps of the analysis, i.e. for both the data acquisition and the searching within the acquired data. Therewith it is not necessary to upload the content of the trace memory into a separate search device such as a workstation for searching the captured data.

As result, a powerful and fast search function can be realized with less complexity compared to an approach, wherein the search function is carried out remotely in a separate search device.

Further, as the pattern matcher is equipped with powerful data comparing capabilities, searching the captured data is significantly faster than searching by means of a software-controlled search algorithm provided by a workstation. This is due to the fact that search algorithms realized by software programs are rather slow compared to a realization in hardware. As memory sizes of trace memories of present analyzers are quite large (often more than 1 GByte), search time plays a significant role in the data analyzing process.

The advantage of this embodiment is that due to faster tests, increased test coverage is achieved at the same costs or even at lower costs compared to an analyzer with distinct data capturing and data searching circuits or units, thus allowing a higher test quality.

In a further embodiment, the analyzer comprises a controller for initiating and controlling the first and the second step. The controller comprises a user interface for entering the data patterns to be loaded to or activated in the pattern matcher and/or for initiating the first and second step.

In a further embodiment, he controller is adapted for repeating the second step with each a different data pattern to be loaded to the pattern matcher.

In a further embodiment, a counter is comprised for counting the number of occurrences of the different data patterns.

In a further embodiment, the analyzer comprises a plurality of pattern matchers that receive the data stream in parallel and each generate a different match signal provided to the controller, depending on the each loaded or activated data pattern. Therefore, each pattern matcher can be programmed to one of a plurality of different patterns. This embodiment has the advantage that the incoming data stream can be compared to different data patterns in parallel. Each pattern might comprise so-called don't care positions. This allows for detecting if the data stream matches to a part of the corresponding pattern.

In a further embodiment, the analyzer comprises a trigger circuit. The trigger circuit comprises a state machine and determines an actual state on the base of the match signals and the last state. Therefore, the trigger circuit preferably comprises a feed back loop to read back the actual state to its input. A trigger signal is generated if the state machine enters a defined state. This allows for searching an arbitrary sequence of patterns, e.g. a first data packet "A" followed by a second packed "B".

In a further embodiment, the analyzer comprises a run control unit for generating a trace memory control signal depending on the trigger signal received from the trigger circuit such that the data acquisition is stopped at a pre-defined time or pre-defined amount of acquired data after the trigger event determined by the trigger circuit.

It is clear that the invention can be partly or entirely embodied or supported by one or more suitable software programs, which can be stored on or otherwise provided by any kind of data carrier, and which might be executed in or by any suitable data processing unit.

BRIEF DESCRIPTION OF DRAWINGS

Other objects and many of the attendant advantages of embodiments of the present invention will be readily appreciated and become better understood by reference to the following more detailed description of preferred embodi

DETAILED DESCRIPTION OF THE PREFERRED EMBODIMENT

Figure 1:
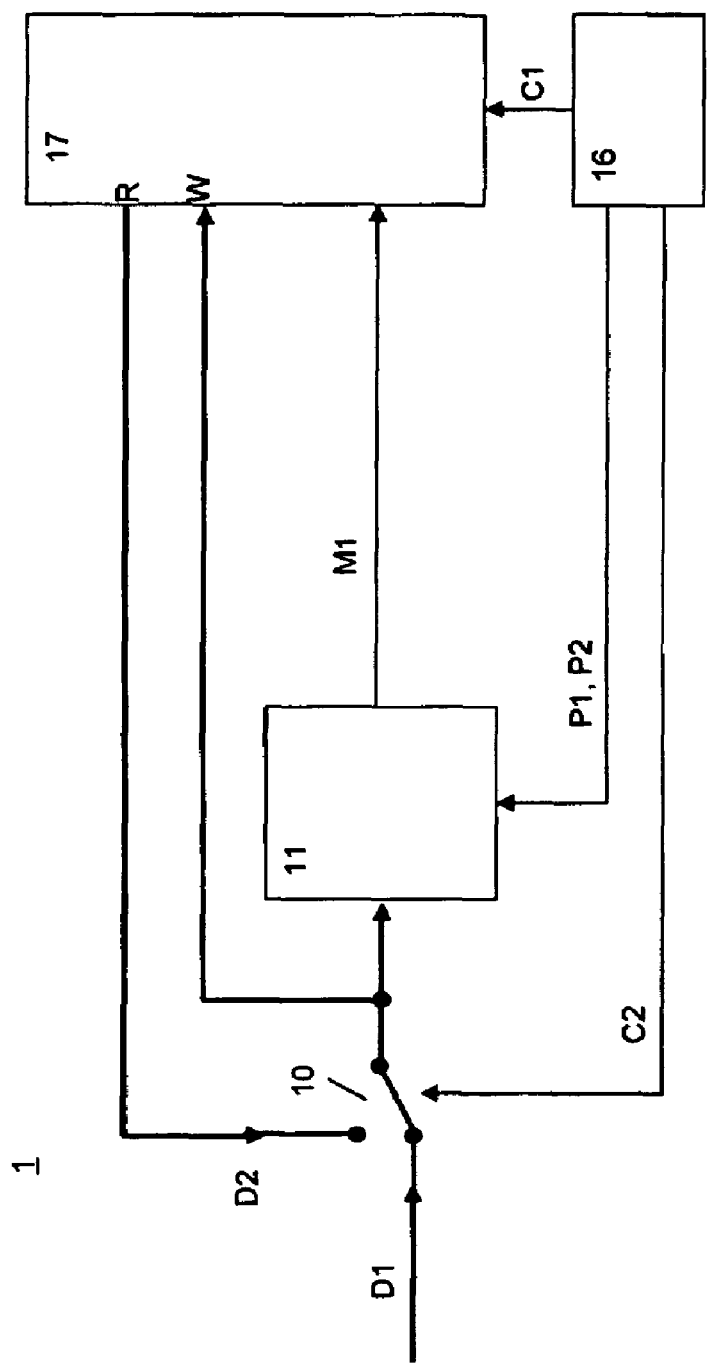
- FIG. 1 shows a principal functional block diagram of a protocol analyzer.

FIG. 1 shows a protocol analyzer 1 with a (first) pattern matcher 11, a control circuit 16, a trace memory 17, and a data switch 10 with two switch inputs and one switch output. A first or incoming data stream D1 and a second or trace memory data stream D2 from a read output R of trace memory 17 are provided to the first and second input of the data switch 10 respectively. In a first switch state, the data switch passes the first data stream D1 to the switch output, and in a second switch state, the data switch passes the second data stream D2 to the switch output. The switch output is connected to the pattern matcher 11 and to a write input W of the trace memory 17. The pattern matcher 11 is adapted to compare the received data stream with selectable pre-defined data patterns P1 and P2 and provides a (first) match signal M1, indicating whether a pattern match was detected or not. This signal is provided to a control input of the trace memory 17.

The control circuit 16 provides a data switch signal C2 to control the data switch 10 to switch between the first state and the second state, thus determining whether the incoming data stream D1 or the trace memory data stream D2 will be provided to the pattern matcher 11.

Further the control circuit 16 provides a trace memory control signal C1 to advice the trace memory 17 either to capture at its write input W the incoming data stream D1 provided by the data switch 10, being switched to the first state, or to provide a data stream D2 of the captured data at the read output R over the data switch 10, being switched to the second state, to the pattern matcher 11.

In a first or data acquisition stage, data switch 10 is controlled to switch to the first state, thus providing the incoming data stream D1 to the pattern matcher 11 and to the trace memory 17. The pattern matcher 17 is loaded with a first data pattern P1. If the pattern matcher detects a match between the first data pattern P1 and the incoming data stream D1, it provides match signal M1 as a trigger signal to the trace memory 17.

The trace memory 17 starts capturing the incoming data until the trigger signal is received. The trace memory continuously captures the incoming data D1 until the trigger signal is received. Thus, if the memory is completely written from the first to the last memory address, the memory continues again at the first address thus overwriting the corresponding stored data. In the simple case shown here, data acquisition is stopped suddenly, if a match is detected. In this case only data captured before the trigger event is captured. However, as will be shown in the FIG. 2 in more detail, the data acquisition might be stopped after a pre-defined time or amount of post-storage after the trigger event. In this case the trigger memory keeps one pre-storage part and one post-storage part relative to the trigger event.

In a second or data search stage, the acquired data stored in the trace memory 17 is analyzed in more detail. To initiate this step, the control circuit 16 controls the data switch 10 to switch to the second state and the trace memory to output the second data stream D2 to the pattern matcher 11. Further, the pattern matcher 17 is loaded with the second data pattern P2. If the pattern matcher detects a match between the second data pattern P2 and the second data stream D2, it provides again a match signal M1 that is now being interpreted as a "found" indication.

In an alternative to the embodiment, this signal is provided to a counter not shown in FIG. 1 counting the number of trigger occurrences.

In an alternative to the embodiment, the choice of the second pattern might be based on a manual or an automatic analysis.

Figure 2:
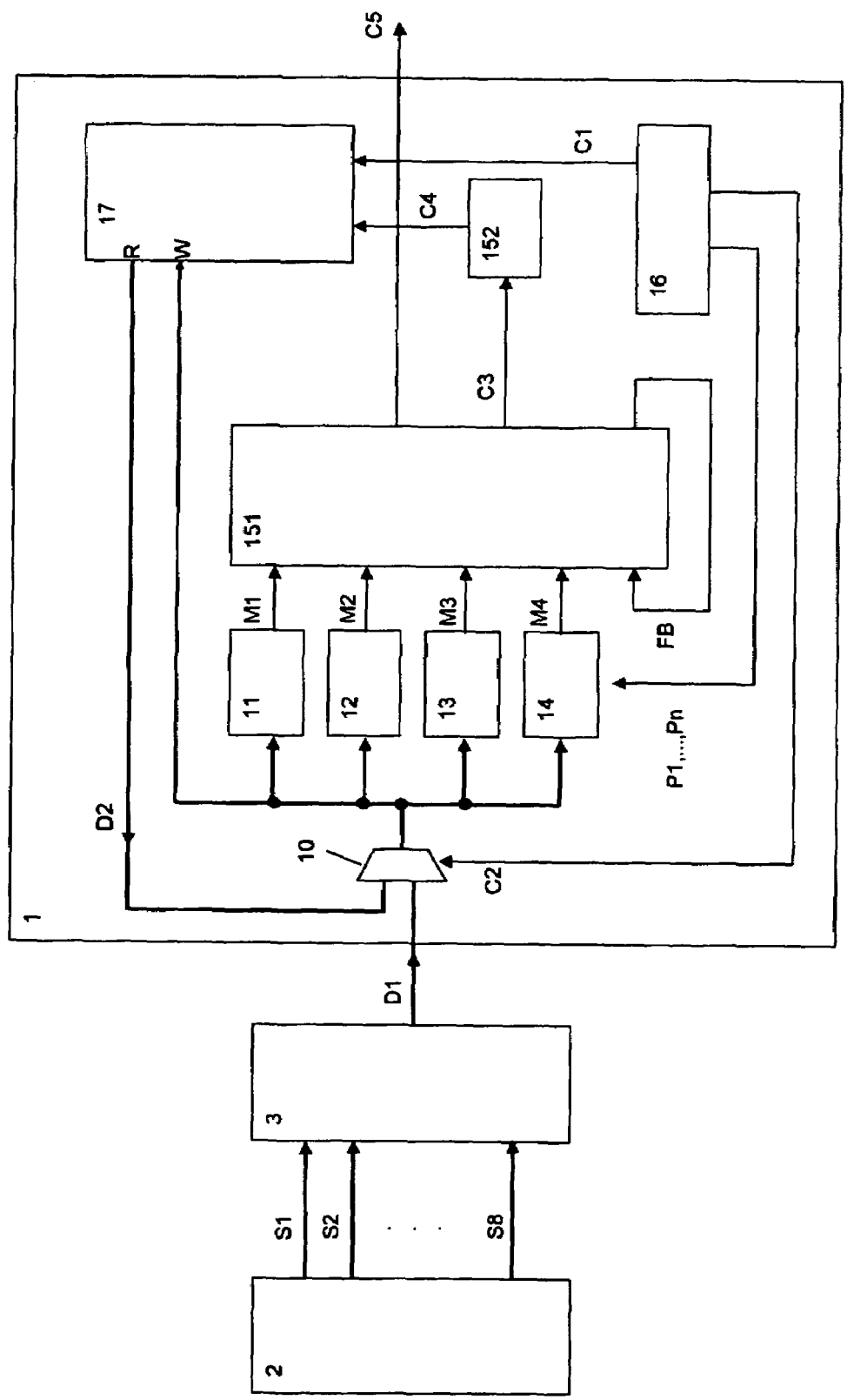
FIG. 2 shows an analyzing setup with an exemplary detailed functional block diagram of the protocol analyzer.

FIG. 2 shows an analyzing setup with an exemplary block diagram of the protocol analyzer 1 in greater detail. FIG. 1 shows the protocol analyzer 1, a device under test-DUT-2 and a de-serializer 3. By way of example, eight digital data streams S1-S8 are provided from DUT pins of the DUT 2 to the de-serializer 3. The de-serializer combines these digital data streams into one data stream, wherein each data value represents a multiple bit value and provides a corresponding data stream D1 to the protocol analyzer 1. The protocol analyzer 1 comprises in addition to FIG. 1 by way of example three further pattern matchers 12-14, a trigger sequencer 151, and a run control block 152. The data switch 10 is realized by means of a multiplexer.

The pattern matchers 11-14 are connected in parallel to output of the data switch 10. Match signals M1-M4 from each of the pattern matchers 11-14 are provided to inputs of the trigger sequencer 151. Further a state feedback signal FB is provided from the output of the trigger sequencer 151 as further input to the sequencer 151. The trigger sequencer 151 provides a trigger signal C3 to the run control block 152. The run control block 152 generates a trace memory control signal C4 to the (first) trace memory 17. Corresponding to FIG. 1, the control circuit 16 provides the data switch signal C2 to control the multiplexer 10 to switch between the first state and the second state, thus determining whether the incoming data stream D1 or the trace memory data stream D2 will be provided to the pattern matchers 11-14.

The pattern matchers 11-14 each compare the incoming data stream D1 against each one of each patterns P1-Pn loaded from or activated by the control circuit 16 and generate corresponding match signals M1-M4.

The trigger sequencer 151 is a user-configurable finite state machine e.g. comprising 8 states. Depending on the match signals M1-M4, state transitions between these states are performed. The encoded states are fed back by means of the state feedback signals FB to the input of the trigger sequencer 151 (e.g. for 8 states, 3 FB signals are required). Therewith, the actual state is determined by the previous state and the states of the match signals M1-M4. The desired conditions are programmed independently for the data acquisition stage and the search stage according to the desired sequence.

The trigger sequencer 151 allows triggering on programmable pattern sequences. As one simple example, trigger sequencer 151 can recognize "pattern A followed by pattern B".

It is further possible to load the pattern matchers dynamically with data determined during run-time. This allows for searching pattern sequences, where parts of patterns might be dependent on previously found patterns.

The trigger signal C3 is used in the run-control block 152 to determine the time point to stop data acquisition and to generate a corresponding trace memory control signal C4 data to be provided to the trace memory 17. As example, data acquisition might be stopped immediately after a trigger event determined by the trigger sequencer 15, or after a defined amount data acquired after the trigger event, e.g. such that half of the trigger memory 17 comprises the data of the incoming data stream before the trigger event and the other half of the trigger memory 17 comprises the data received after the trigger event.

If a trigger event is determined in the second stage, the trigger sequencer 151 generates a found signal C5. Data search might be stopped soon after generation of the found signal C5. Alternatively, the found signal C5, which might be provided to a counter not shown here for counting trigger events.

Figure 3:
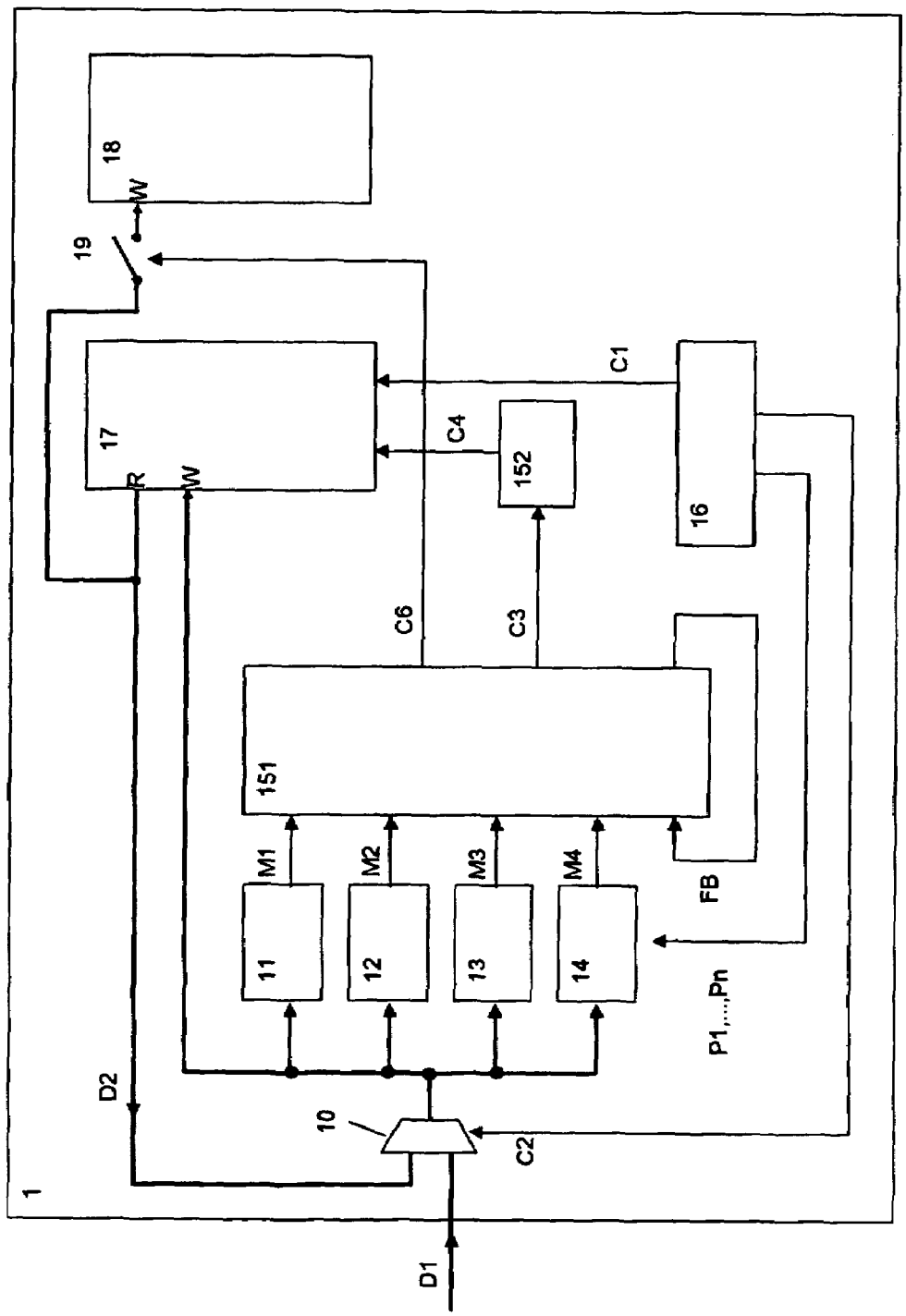
FIG. 3 shows an alternative functional block diagram of the protocol analyzer.

FIG. 3 shows a further embodiment of the analyzer 1 shown in FIG. 2. FIG. 3 therefore additionally shows a second trace 18 with a write input W. The read output R of the first trace memory 17 is connected over a filter switch 19 to the write input W of second trace memory 18. The filter switch 19 is controlled by means of a filter signal C6 provided by the trigger sequencer 151.

Similar to the search operation of the data search stage described above, the pattern matchers 11-14 and the trigger sequencer 151 are programmed with desired patterns and with a desired sequence correspondingly. The data is then read from the (first) trace memory 17 and fed into the pattern matchers 11-14. The trigger sequencer 151 determines, which of the vectors shall be written from the first trace memory 17 into the second trace memory 18 and generates a corresponding filter signal C6.

After the desired portion of the trace memory has been processed, the second trace memory 18 contains the filtered data. Similar to the search function, this filter function is performed at high speed due to the powerful data comparing capabilities of the pattern matchers. Thus it is possible to realize a significantly faster filter function compared to any software programmed filter function provided by a remote computer.

In an example, the 8 digital data streams S1-S8 each have a data rate of 2.5 Gigabit per second. The de-serializer combines these signals into one signal, reduces the data rate of the data stream D1 to 125 MHz and performs some conversion (e.g. a 10 to 8 bit conversion). The values of the data stream are thus data words of a plurality of bits, e.g. of 128 bit.

It is clear that the blocks of FIG. 1, FIG. 2 and FIG. 3 only show possible functional distributions among a plurality of different functional distribution. The functional blocks can be grouped to physical units (circuits, boards etc.) in any combination. It is thus especially possible to integrate a plurality of functions into one physical unit or to provide for one functional block each one or even a plurality of physical units. It is further possible to realize the functions either by hardware or by software to be executed on a processing unit, or as a mixture of hardware and software.

What is claimed is:

1. A data analyzer for analyzing a incoming first data stream provided by a data source, comprising:
   a pattern matcher adapted for comparing in a first step the first data stream with a first data pattern and in a second step a second data stream with a second data pattern and for generating a match signal indicative of a match between the first data stream and the first data pattern or between the second data stream and the second data pattern,
   a trace memory adapted for storing a part of the first data stream dependent on the match signal of the first step, and for outputting stored data as second data stream in a second step and
   a data switch adapted for receiving the first data stream and the second data stream, and to be set in the first step to a first state for providing the pattern matcher with the first data stream and in the second step to a second state for providing the pattern matcher with the second data stream.

2. The analyzer of claim 1, comprising a controller that is adapted to control the pattern matcher, the trace memory and the data switch for initiating the first and second steps.

3. The analyzer of claim 2, wherein the controller is adapted to control:
   in the first step setting the data switch to the first state, setting the pattern matcher to the first data pattern and activating the trace memory for storing the part of the incoming data stream, and
   in the second step setting the data switch to the second state, setting the pattern matcher to the second data pattern, activating the trace memory to output the second stream.

4. The analyzer of claim 2, wherein the controller comprises a user interface that is adapted to at least one of: entering the data patterns and initiating the first and second step.

5. The analyzer of claim 2, wherein the controller is adapted for repeating the second step with each a different data pattern to be loaded to the pattern matcher.

6. The analyzer of claim 5, wherein a counter is comprised adapted four counting the trigger signal occurrences for each of the different data patterns.

7. The analyzer of claim 1, comprising one or more further pattern matchers that are adapted for receiving the data stream in parallel and for generating each a match signal dependent on each an activated data pattern.

8. The analyzer of claim 7, further comprising a trigger circuit adapted for generating a trigger signal on the base of said match signals to be provided to the trace memory for storing a selected part of the first data stream.

9. The analyzer of claim 8, wherein the trigger circuit comprising a state machine that is adapted for determining an actual state on the base of the match signals and a previous state, and generating the trigger signal further dependent on actual state.

10. The analyzer of claim 7, further comprising a run control circuit that is adapted for generating a trace memory control signal depending on the trigger signal received from the trigger circuit to control the trace memory such that the trigger memory stops the data acquisition after one of: a pre-defined time and a pre-defined amount of received data.

11. The analyzer of claim 1, wherein the incoming data stream, the second data stream are sequences of data of a plurality of parallel bits.

12. The analyzer of claim 1, comprising a second trace memory that is connected over a controllable connection to the first trace memory and wherein the controllable connection is adapted to be controlled by the trigger circuit such that selected data of the second data stream is stored in the second trace memory.

13. A method of analyzing a first data stream, comprising the steps of:
   providing a pattern matcher with a first data stream for comparing the first data stream with a first data pattern and generating a match signal indicative of a match between the first data stream and the first data pattern, storing in a trace memory a part of the first data stream dependent on the match signal and outputting stored data as second data stream and providing the pattern matcher with the second data stream for comparing the second data stream with a second data pattern and generating a match signal indicative of a match between the second data stream and the second data pattern.

14. A software program or product, preferably stored on a data carrier, for controlling the following steps, when run on a data processing system of the analyzer:

providing a pattern matcher with a first data stream for comparing the first data stream with a first data pattern and generating a match signal indicative of a match between the first data stream and the first data pattern, storing in a trace memory a part of the first data stream dependent on the match signal and outputting stored data as second data stream and providing the pattern matcher with the second data stream for comparing the second data stream with a second data pattern and generating a match signal indicative of a match between the second data stream and the second data pattern.

* * * * *